United States Patent [19]

Okita et al.

[11] Patent Number: 4,766,510
[45] Date of Patent: Aug. 23, 1988

[54] CARRIAGE SHIFT ASSEMBLY FOR DISC DRIVING DEVICE

[75] Inventors: Masao Okita; Tadami Sugawara; Hiroshi Yoshida, all of Furukawa, Japan

[73] Assignee: Alps Electric Co., Ltd., Japan

[21] Appl. No.: 869,035

[22] Filed: May 30, 1986

[30] Foreign Application Priority Data

May 30, 1985 [JP] Japan .............................. 60-79973[U]

[51] Int. Cl.[4] .......................... G11B 5/55; G11B 5/012
[52] U.S. Cl. ....................................... 360/106; 360/97
[58] Field of Search ..................................... 360/97–99, 360/105, 106, 104

[56] References Cited

U.S. PATENT DOCUMENTS

| 3,936,879 | 2/1976 | Gustafson | 360/99 |
| 4,224,648 | 9/1980 | Roling | 360/97 |
| 4,315,290 | 2/1982 | Kukreja | 360/106 |
| 4,641,212 | 2/1987 | Yokota et al. | 360/99 |
| 4,642,717 | 2/1987 | Matsuda et al. | 360/97 |
| 4,652,951 | 3/1987 | Kirn | 360/106 |

FOREIGN PATENT DOCUMENTS

| 0076064 | 4/1983 | European Pat. Off. | 360/97 |
| 58-102364 | 6/1983 | Japan | 360/97 |

Primary Examiner—John H. Wolff
Assistant Examiner—Matthew J. Bussan
Attorney, Agent, or Firm—Guy W. Shoup; Leighton K. Chong

[57] ABSTRACT

A disc driving device including a drive mechanism for rotating a disc-like magnetic recording medium to record and reproduce information with respect to the recording medium; a stepping motor provided with a screw shaft, the screw shaft extending through a body of the stepping motor from a bearing portion provided in the stepping motor body up to a bearing portion provided at an opposite end side, and the screw shaft being partially formed with a feed screw; a guide rod disposed in parallel with the screw shaft; a carriage which is slidable along the guide rod and which has an engaging piece, the engaging piece being engaged with the feed screw to convert a rotational motion of the stepping motor into a linear motion and effecting a vertical positioning for the carriage; and a housing formed with guide slots capable of receiving therein the guide rod and both bearing portions of the stepping motor, the guide rod and the stepping motor bearing portions being mounted into the guide slots of the housing from the side where the recording medium is placed.

1 Claim, 13 Drawing Sheets

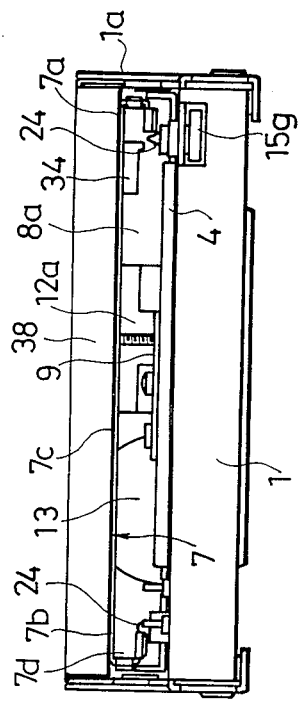
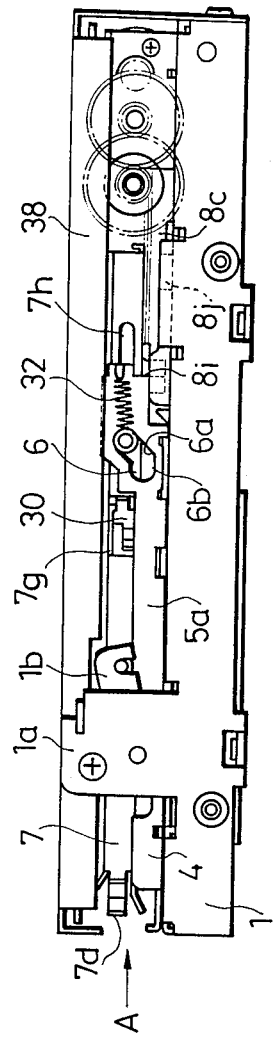

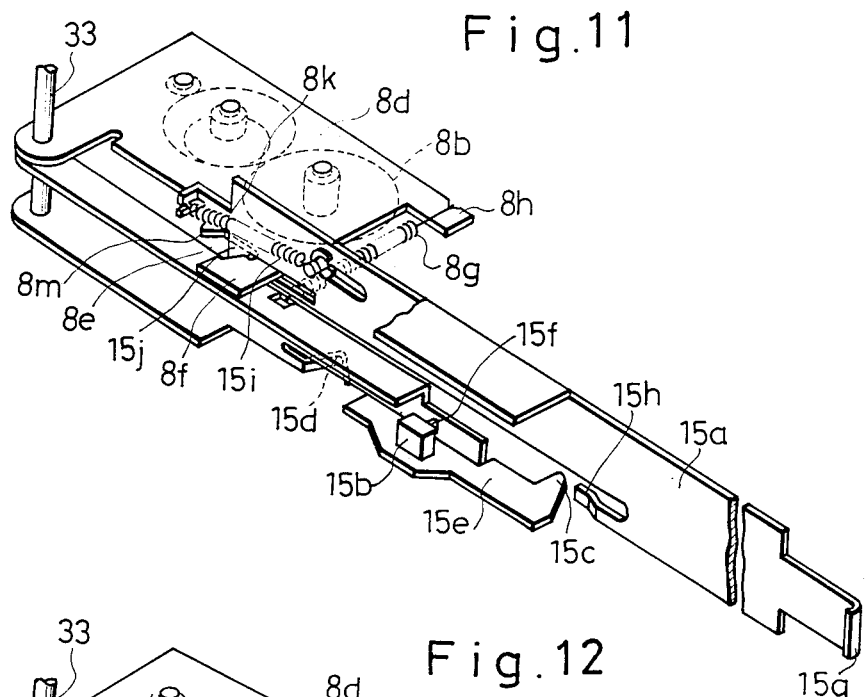
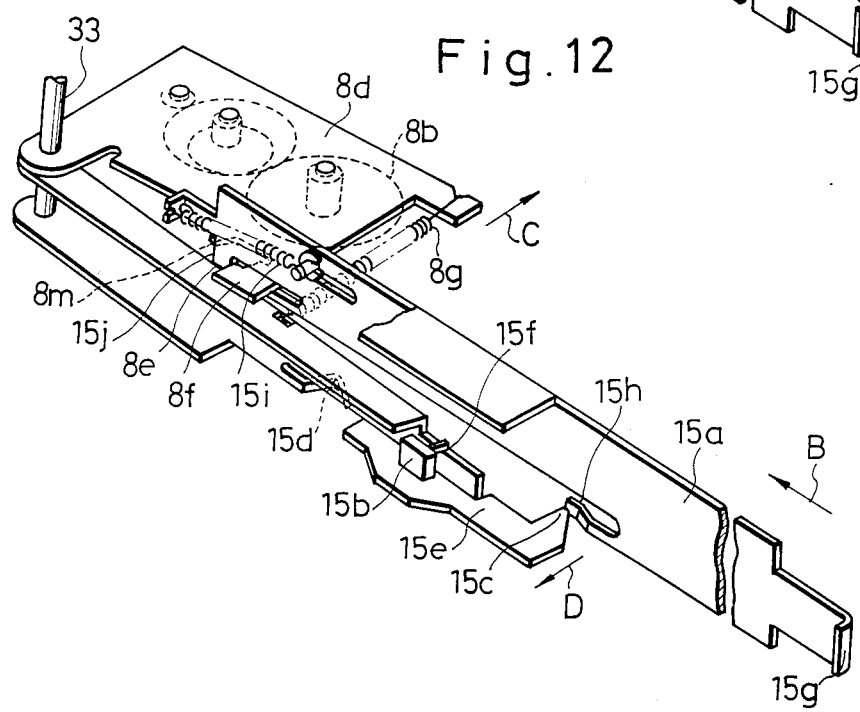

CARRIAGE SHIFT ASSEMBLY FOR DISC DRIVING DEVICE

BACKGROUND OF THE INVENTION

1. Field of the Invention

The present invention relates to a disc driving device for driving a disc-like magnetic recording medium to record and reproduce information and more particularly to a disc driving device having a shift mechanism of a simple construction.

2. Description of the Prior Art

In a disc driving device for driving a disc-like magnetic recording medium (hereinafter referred to simply as "disc") to effect information recording and playback, the reduction in size of the device has been promoted with increase in density of information and reduction in size of the disc.

In a conventional disc driving device, as a carriage moving mechanism for moving a carriage which carries a magnetic head thereon intermittently in a radial direction of the disc, there have been both a steel belt type and a screw shaft type. The former type is disadvantageous in that the space factor is low in addition to troublesome operations required for mounting a belt and adjusting tension. For this reason, the number of shift mechanisms which adopt the latter screw shaft type has been increasing recently.

FIG. 15 shows an example of such a conventional screw shaft type carriage moving mechanism, in which the reference numeral 50 denotes a housing and numeral 51 denotes a stepping motor. A casing 52 of the stepping motor 51 is secured to the housing 50 with bolts 53. Within the casing 52, a coil 55 wound round a coil bobbin 54 and a comb teeth-like yoke 56 integral with the casing 52 are mounted as motor stator-side components, and a cylindrical permanent magnet 57 is mounted as a motor rotor.

Numeral 58 denotes a screw shaft having a spiral groove 58a formed on its outer peripheral surface. The screw shaft 58, with the permanent magnet 57 fitted thereon fixedly, is supported rotatably at its conical ends of a small diameter by bearings 59 and 60 comprising ball bearings. The bearing 59 is held by the housing 50 through a holder 62 to prevent its falling off. And it is urged toward the screw shaft 58 at all times by means of a spring 63 disposed within the holder 62. Consequently, the screw shaft 58 is urged toward the bearing 60 at all times. The bearing 60 is attached to an adjust screw 65 which is threadedly fitted in a support member 64 mounted to the stepping motor 51. The screw shaft 58 can be adjusted slightly in a thrust direction by turning the adjust screw 65.

Numeral 68 denotes a carriage which carries a writing/reading magnetic head (not shown) thereon and which is moved along guide rods 69. Numeral 70 denotes an engaging piece attached to the carriage 68, the engaging piece 70 having a conical tip which is in resilient engagement with the spiral groove 58a of the screw shaft 58. Under such an arrangement, as the screw shaft 58 is rotated forward and reverse by the stepping motor 51, the tip portion 70a of the engaging piece 70 fitted in the spiral groove 58a moves, so that the carriage 68 is reciprocated by distances corresponding to the amounts of rotation of the screw shaft 58 in approximately the same direction as the screw shaft along the guide rods 69.

In the above shift mechanism, the stepping motor 51 is mounted by utilization of lateral holes 50a, 50b and tapped holes 50c which are all formed in the housing 50. Two guide rods 69 are provided generally parallel to the screw shaft 58 of the stepping motor 51. Both ends of each guide rod 59 are attached to slots (not shown) formed in the housing 50, which slots are formed accurately as a reference plane for maintaining the height of the carriage constant. Consequently, the carriage 68 can be moved always along the plane formed by the two guide rods 69 regardless of in which position the tip portion 70a of the engaging piece 70 engages the spiral groove 58a of the screw shaft 58. Where the moving plane of the carriage 68 is thus defined by the two guide rods 69, the mounting accuracy of the screw shaft 58, namely, the mounting accuracy of the stepping motor 51, need not be so high as that of the guide rods 69, and even if it is relatively rough, a practically sufficient transfer accuracy is obtained. For this reason, usually the screw shaft 58 is loosely fitted in the lateral hole 50a formed in the housing 50 and the bearing 59 of the screw shaft 58 is fitted in the holder 62 which is press-fitted in the lateral hole 50b formed in a side wall of the housing 50, and a side wall of the casing 52 is mounted to the side wall of the housing 50 through bolts 53 in the tapped holes 50c. Before tightening the bolts 53, the position of the screw shaft 58 is adjusted by moving the body of the stepping motor 51, and thereafter the bolts are tightened and fixed.

Where the shift mechanism constructed as above is to be reduced in size and simplified in structure, it is considered extremely rational to omit one of the two guide rods 69, that is, constitute the shift mechanism by a single guide rod and a single screw shaft 58. In this case, it is necessary for the screw shaft 58 to have both a guide function and a feed function. But if a guide function is imparted to the screw shaft 58, there arises a problem in point of its mounting accuracy.

In this connection, for adjustment of the screw shaft 58, the shaft is loosely fitted in the lateral hole 50a formed in the housing 50 and is adjusted with bolts 53, and therefore an error may occur depending on how to tighten the bolts 53, making it difficult to attain a predetermined accuracy and requiring much time for the adjustment, thus leading to increase of cost.

SUMMARY OF THE INVENTION

The present invention has been accomplished in view of the above prior art and it is the object thereof to provide a disc driving device having a shift mechanism of low cost formed accurately.

According to the present invention, in order to achieve the above object, there is provided a disc driving device including a drive mechanism for rotating a disc-like magnetic recording medium to record and reproduce information with respect to the recording medium, a carriage having a magnetic head, and a shift mechanism for moving the carriage in a radial direction of the magnetic recording medium, characterized by including a stepping motor, the stepping motor being provided with a screw shaft extending through a body of the stepping motor and having a feed screw formed thereon and also provided with bearing portions on a front end side of the screw shaft far from the body of the stepping motor and on a base end side which is an opposite side with respect to the body; a single guide rod disposed in parallel with the screw shaft; and a housing formed with guide slots capable of receiving therein the guide rod and the bearing portions of the screw shaft, the guide rod and the screw shaft bearing portions being mounted to the guide slots from the side where the recording medium is placed, further characterized in that the carriage is slidable along the guide rod and has an engaging piece, the engaging piece being engaged with the feed screw for converting a rotational motion of the stepping motor into a linear motion and effecting a vertical positioning relative to the magnetic medium. In this construction, the guide rod mounting surface and the screw shaft bearing mounting surface can be defined by the bottom faces of the guide slots, thus permitting an accurate positioning of the guide rod and the screw shaft. Moreover, a good surface accuracy can be attained at low cost because machining can be done from the guide rod mounting side of the housing.

BRIEF DESCRIPTION OF THE DRAWINGS

FIGS. 1 to 12 illustrate a first embodiment of the present invention, of which:

FIG. 2 is a schematic plan view of the whole of a disc driving device;

FIG. 3 is a bottom view thereof;

FIG. 4 is a front view thereof;

FIG. 5 is a right side view thereof;

FIGS. 6 to 10 are views explanatory of an auto loading operation, of which:

FIG. 6 is a plan view showing a state in which a cartridge has been inserted up to a predetermined position in a holder and auto loading is about to be started;

FIG. 7 is a plan view showing a state in which a disc has been loaded onto a turntable;

FIG. 8 is a side view showing a state similar to FIG. 6;

FIG. 9 is a side view showing a state in which the holder has advanced up to the position of the turntable; and FIG. 10 is a side view showing a state similar to FIG. 7;

FIGS. 11 and 12 are views explanatory of a manual eject operation, of which:

FIG. 11 is a perspective view of a principal portion showing a state not in operation; and FIG. 12 is a perspective view of a principal portion showing a state in operation;

FIG. 14 illustrates a second embodiment of the invention, in which:

DESCRIPTION OF PREFERRED EMBODIMENTS

Figure 1A:
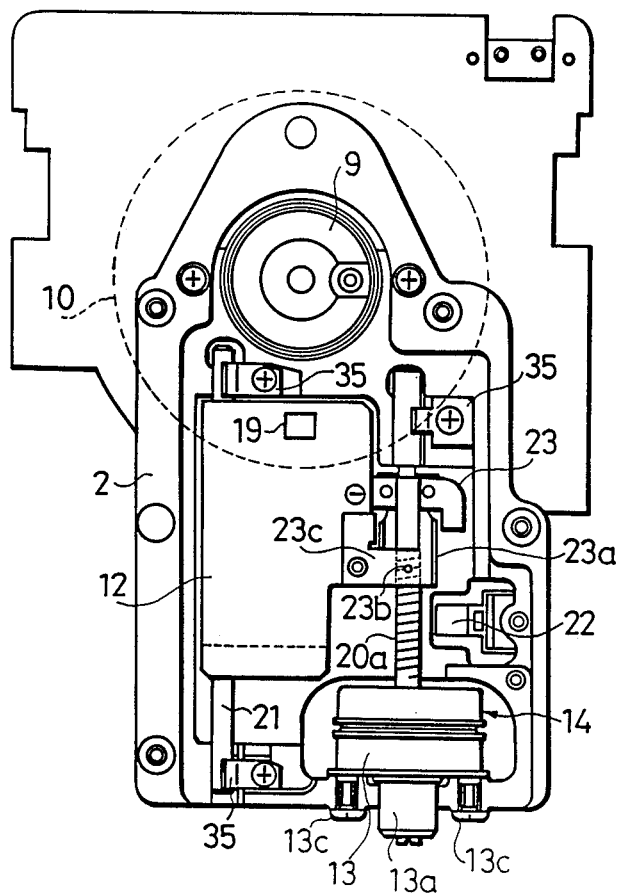
FIG. 1(a) is a plan view showing a relation among a housing, a guide rod and a stepping motor.
Figure 1B:
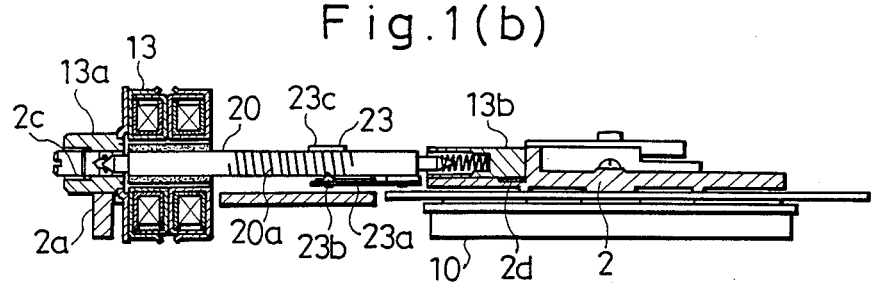
FIG. 1(b) is a sectional view showing a mounted state of the stepping motor to the housing.

Embodiments of the present invention will be described hereinunder with reference to the drawings.

FIGS. 1 to 12 illustrate a first embodiment of the invention and reference will first be made to Figs. 1 to 4 showing a schematic construction of a disc driving device. The disc driving device is mainly composed of a frame 1; a housing 2 which is mounted to a predetermined position of the frame 1 from a lower surface side of the frame in the figure; a load member 4 mounted slidably on an upper surface of the frame 1 on an insertion side of a disc cartridge 3; a holder 7 adapted to engage a cam portion 6 of a side wall 5a formed at a side face of the load member 4 to hold the disc cartridge 3; a load member driving mechanism 8 for driving the load member 4 on the upper surface of the frame 1; a motor 10 for rotating a turntable 9 located below the housing 2 and projecting to an upper surface side thereof, the motor 10 constituting a disc driving mechanism conjointly with the turntable 9; a carriage 12 adapted to be moved in a radial direction of a disc 11 on an upper surface of the housing 2; a shift mechanism 14 for moving the carriage 12 by means of a stepping motor 13; and a manual inject mechanism 15 capable of injection the cartridge 3 manually.

In the housing 2 formed separately from the frame 1 are provided, as shown in FIG. 1(a), the motor 10 having the turntable 9 on its upper surface; the stepping motor 13 for rotating a screw shaft 20 which has a threaded groove 20a formed for shifting the carriage 12; the carriage 12 engaged with the threaded groove 20a at one side and supported by a guide rod 21 at an opposite side for sliding motion on the same rod; and a 0-track sensor for detecting a 0-track position on the disc 11 of a magnetic head 19 provided at a fore end portion of the carriage 12. An engaging piece 23 is in engagement with the threaded groove 20a of the screw shaft 20 at one side of the carriage 12. It is composed of a tip portion 23b which is in direct engagement with the threaded groove 20a at a fore end side of a plate spring 23a, and a pressing portion 23c opposed to the tip portion 23b to hold the screw shaft 20 therebetween. Conjointly with the guide rod 21, the engaging piece 23 defines the height of the carriage 12. The shift mechanism 14 for the carriage 12 is constituted by the stepping motor 13 provided with the screw shaft 20 which drives the carriage.

Figure 2:
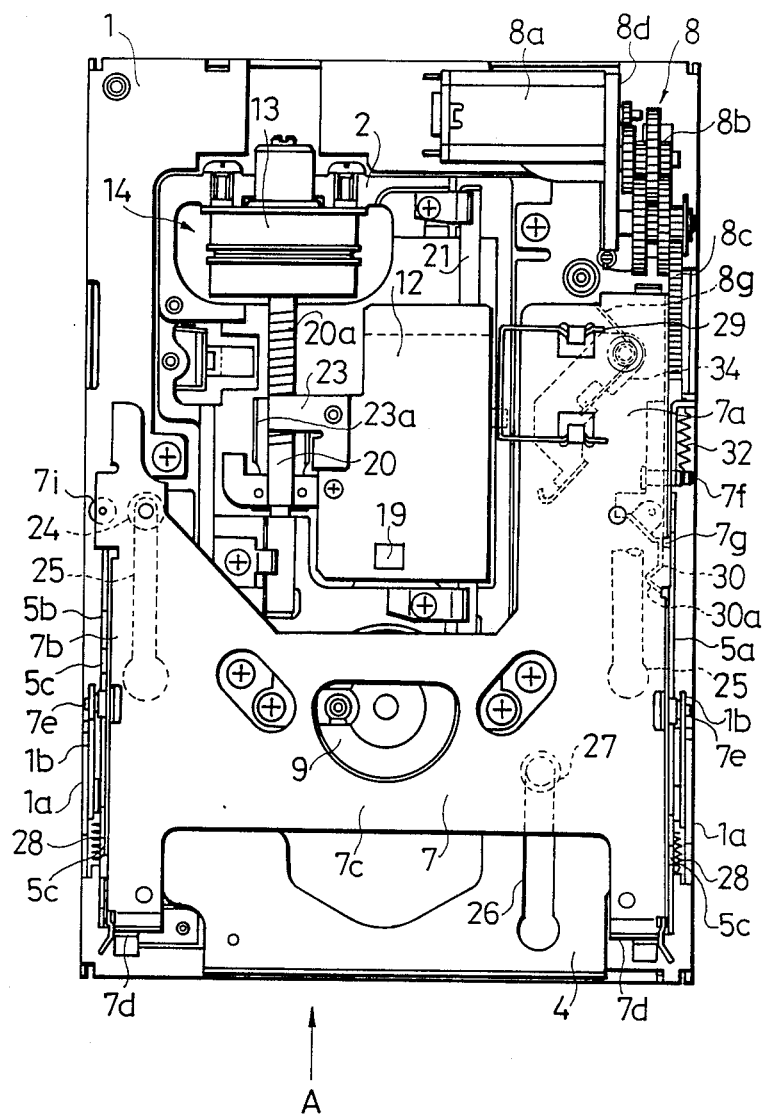
Figure 3:
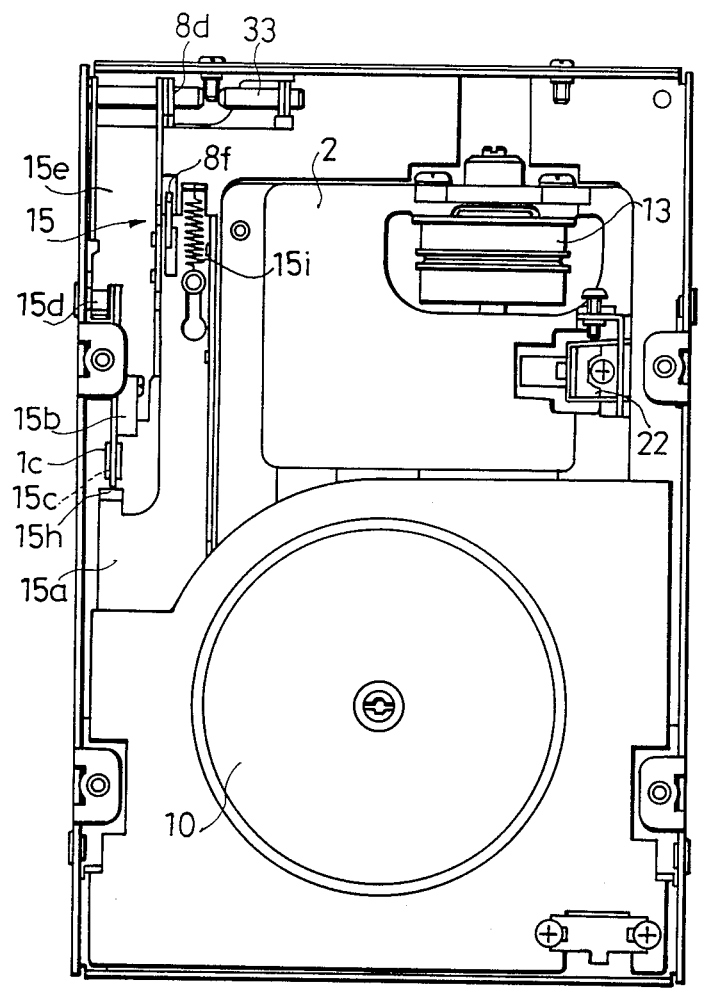

In FIGS. 2 and 5, on a cartridge insertion side A of the frame 1 there is mounted the load member 4 having a right-hand side wall 5a formed with a cam portion 6 and a guide slot 5c, the cam portion 6 comprising an inclined cam part 6a and a parallel cam part 6b and also having a left-hand side wall 5b formed with two guide slots 5c. The load member 4 is further formed with guide slots 25 engaged with positioning pins 24 for the cartridge 3 as well as a guide slot 26 engaged with a pin 27. The load member 4 is slidable along the guide slots 25 and 26 and it is urged toward the cartridge insertion side A at all times by means of a spring (not shown).

From both side faces of the frame 1 are erected side plates 1a and inside the side plates 1a are provided retaining members 1b whose fore ends are urged toward a lower side of the frame 1 by means of springs 28.

Figure 6:
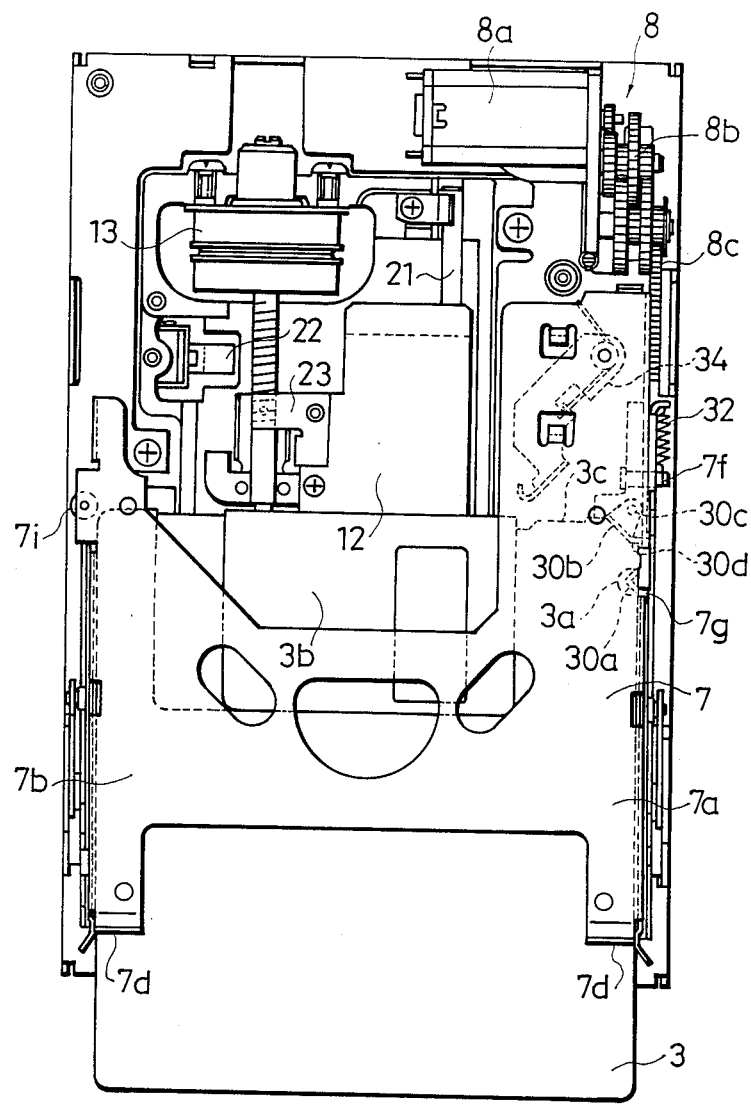
Figure 7:
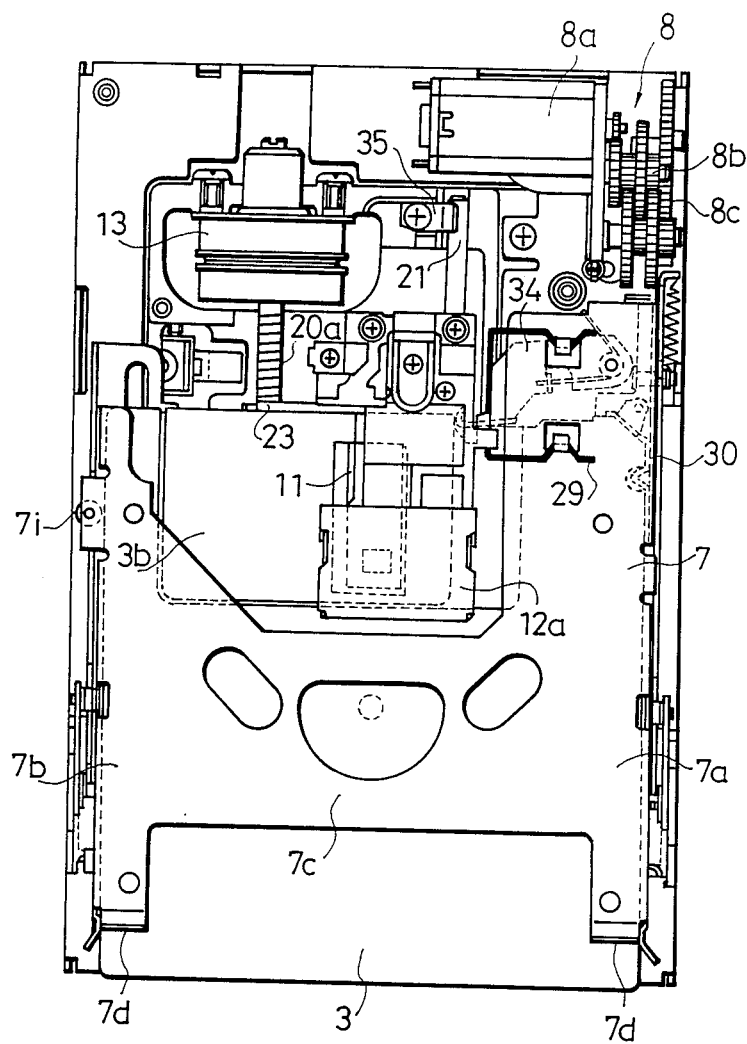
Figure 13:
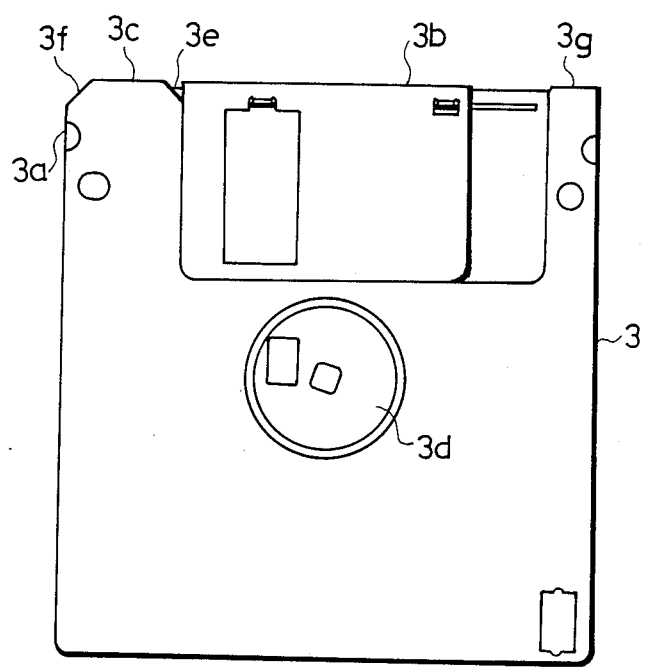
FIG. 13 is a bottom view of a cartridge used in the above embodiment.

As shown in FIGS. 2, 6 and 7, the holder 7 for holding the cartridge 3 after insertion is integrally formed from ]-shaped cartridge holding portions 7a and 7b on both sides and a connecting portion 7c made of a thin resilient plate which connects the cartridge holding portions 7a and 7b. And it has cartridge insertion openings 7d on the cartridge insertion side A. The cartridge holding portions 7a and 7b of the holder 7 are formed with fixed lugs 7e engaged with the guide slots 5c and a moving lug 7f engaged with the cam portion 7. The moving stroke of the moving lug 7f is defined by the length of a guide slot 7h which is formed in a side face of the holder 7 and within which the moving lug 7f is movable. It is set smaller than the moving stroke of the load member 4. As this difference in stroke there is ensured at least a distance corresponding to the length in the stroke direction of the inclined cam part 6a of the cam portion 6. Further, a support member 29 for raising and lowering a load arm 12a of the carriage 12 as will be described later is disposed removably on an upper surface of the cartridge holding portion 7a on the side of the holder 7 where the moving lug 7f is formed. The cartridge holding portion 7a is further provided on the same side with a jointer 30 which is interlocked with the moving lug 7f. The jointer 30 is constructed so that only when the moving lug 7f assumes a position closest to one cartridge insertion opening 7d, a fore end portion 30a of the jointer 30 can project out of the holder 7 through a relief slot 7g formed in a side face of the cartridge holding portion 7a and it can engage an engaging slot 3a formed on one side of the cartridge 3 as shown in FIG. 13. The jointer 30 also serves as a reverse insertion preventing mechanism for the cartridge 3, whereby the cartridge 3 is prevented from being inserted up to a predetermined position when inserted reversely although it can be set in the predetermined position when inserted in the correct direction. Besides, when the cartridge is inserted reversely, the fore end portion 30a of the jointer 30 cannot engage the engaging slot 3a. On the other hand, a guide roller 7i for controlling an insertion posture of the cartridge 3 and making its insertion smooth is attached rotatably to a side face of the cartridge holding portion 7b of the holder 7 on the side of the stepping motor 13 opposite to the jointer 30. The holder 7 is constructed as above. The fixed lugs 7e on the side of the cartridge insertion openings 7d are retained by the retaining members 1b, while the moving lug 7f is mounted on the load member 4 in a state of engagement with the cam portion 6 and is urged in the cartridge insertion direction at all times by means of a spring 32 one end of which is engaged with a terminal end side or the side opposite to the cartridge insertion side of the load member 4.

On the frame 1 there is provided a load member driving mechanism 8 on the side of the cartridge holding portion 7a and on the terminal end side of the load member 4. The load member driving mechanism 8 comprises a loading motor 8a, a group of gears 8b which are driven by the motor 8a, and a rack 8c which is in mesh with the final-stage gear of the gears 8b. It is mounted to a support plate 8d pivotably in parallel with the paper surface of FIG. 5 around a support shaft 33 which is disposed on the lower surface of the frame 1. As shown in FIGS. 11 and 12, on the holder 7 side of the support plate 8d there are formed a projecting piece 8f having an engaging slot 8e engaged with an operating member 15a of a later-described manual eject mechanism 15, as well as an engaging portion 8h for a spring 8g at an upper portion on the same side. The support plate 8d is urged toward the frame 1 by the spring 8g. Further, an engaging slot 8i engaged with a part of the load member 4 is formed in an upper surface of the rack 8c on the side of the load member 4. The slot 8i has a predetermined stroke so that a switching action can be done as will be described later. Moreover, a notch 8j is formed approximately centrally on a lower surface side of the rack 8c and a part of a lock lever 15e shown in FIG. 11 is loosely fitted in the notch 8j while the cartridge is not loaded.

The manual eject mechanism 15 disposed on the lower surface side of the frame 1 comprises the operating member 15a extending from the cartridge insertion side A of the frame 1 up to the projecting piece 8f, the support plate 8d, a switch 15b of the loading motor 8a, a lock pawl 15c for the load member 4, an unlocking pawl 15d loosely fitted in the notch 8j of the rack 8c, and the lock lever 15e which is pivotable about the support shaft 33. The support plate 8d and the lock lever 15e are urged in directions approaching each other by means of the spring 8g. On a side face of the lock lever 15e there projects a switching rod 15f from the switch 15b so as to abut the lower surface of the frame 1. The switch 15b is set so that when the lock lever 15e is pushed down upon abutment of an end face of the load member 4 with the lock pawl 15c, the switching rod 15f extends to perform a switching operation for the loading motor 8a. The operating member 15a is formed with an operating end 15g capable of being pushed on the cartridge insertion side A of the frame 1, and an abutting portion 15h capable of abutting the lock pawl 15c when the operating end is pushed. The operating member 15a is urged toward a cartridge insertion side by means of a spring 15i.

Further, a shutter opening/closing member 34 which opens a shutter 3b at the time of insertion of the cartridge 3 is attached to the holder 7, and a metallic upper cover 38 is mounted over the frame 1, the cover 38 serving as both a protector for the interior mechanisms and an electrical shield.

(Auto Loading Operation)

The following description is provided about an auto loading operation of the disc driving device constructed as above.

Figure 8:
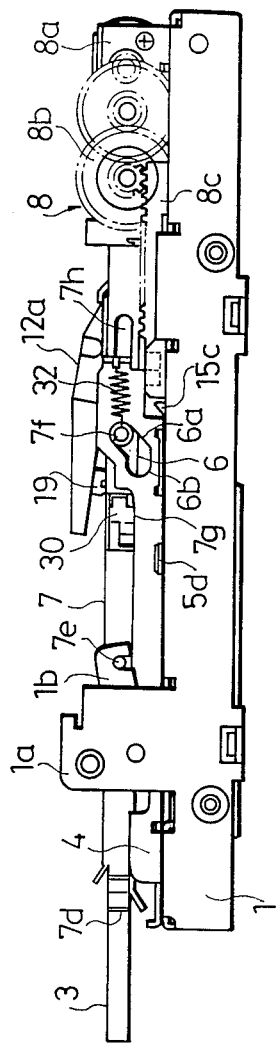
Figure 9:
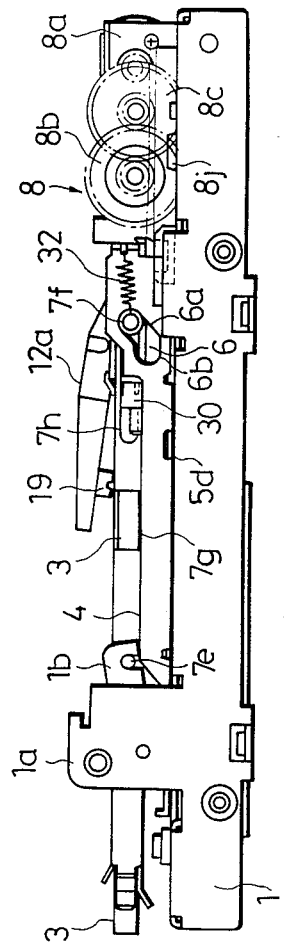

As shown in FIGS. 6 and 8, when the cartridge 3 is inserted in the correct direction from the cartridge insertion opening 7d of the holder 7, it is inserted up to the innermost portion of the holder 7 without abutment of a part thereof with a retraining portion 30d of the jointer 30, and an inclined part 3f formed at one end of a fore end portion 3c of the cartridge 3 abuts an inclined part 30b of the jointer 30 in an opposed fashion, whereby the cartridge 3 is set in a predetermined position. Upon abutment of the inclined part 3f of the cartridge 3 with the inclined part 30b, the jointer 30 turns clockwise in the figure about a shaft 30c and the fore end portion 30a of the jointer 30 comes into engagement with the engaging slot 3a of the cartridge, thus making it possible to load the cartridge 3 toward the turntable 10.

Conversely, in the event the cartridge 3 is inserted in a direction other than the predetermined direction, an angular part other than the inclined part 3f of the cartridge 3, e.g. an angular part 3g of the fore end portion 3c of the cartridge, will abut the retaining portion 30d which is formed closer to the cartridge insertion opening 7d side than the inclined part 30b. Now the cartridge can no longer be inserted beyond the position of the retaining portion 30d; besides, the fore end portion 30a of the jointer 30 is incapable of engaging the engaging slot 3a. Therefore, the cartridge 3 is merely inserted loosely in the holder 7 and it is impossible to effect loading.

Figure 10:
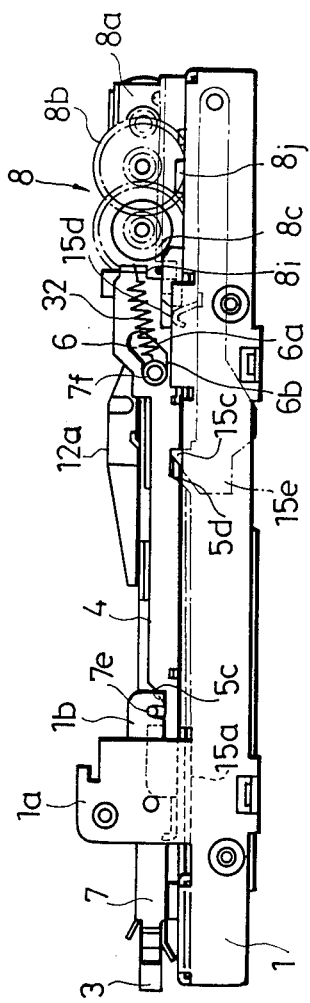

Next, when the cartridge 3 is inserted in the predetermined direction and set in the predetermined position and thereafter pushed slightly in the cartridge inserting direction, namely, in the direction of the magnetic head 19, the load member 4 moves slightly in the same direction and pushes the lock pawl 15c of the lock lever 15e which projects from a lower surface of a slot 1c of the frame 1 to an upper surface side, downwardly of the frame. As the lock lever 15e is pushed downward, the switch rod 15f of the switch 15b extends to the lower surface side of the frame and closes the contact of the switch 15b to turn ON the loading motor 8a through a control circuit (not shown). As a result, the motor starts rotating in the loading direction and the rack 8c moves in the loading direction through the gears 8b, so that the load member 4 moves in the same direction. With the movement of the load member 4, the cartridge 3 moves up to a terminal end in the advancing direction of the guide slot 7h while being pulled by the jointer 30. Now a hub 3b of the cartridge 3 is positioned just above the turntable 9. As the rack 8c further moves in the loading direction from this position, the load member 4 further moves in the same direction while keeping intact the position of the holder 7 parallel to the frame 1 as shown in FIG. 10, so that the moving lug 7f engaged with the slot of the cam portion 6 goes down along the inclined cam part 6a and at the same time the whole of the holder 7 descends. When the moving lug 7f reaches the parallel cam part 6b, the fixed lugs 7e come into engagement with the guide slots 5c formed in the side plates of the load member 4, whereby the cartridge 3 is set in the predetermined position. At this time, the lock pawl 15c fits in a slot 5d formed in the load member 4 and at the same time the switching member 15e rises on the frame 1 side to open the switch 15b so the loading motor 8a stops.

On the other hand, since the load arm 12a is supported by the support member 29 disposed on the upper surface of the holder 7, it is spaced from the carriage 12 located below while the holder 7 is in its raised position, thus permitting the cartridge 3 to be inserted between the load arm 12a and the magnetic head 19 mounted on the carriage 19. Thus, until the cartridge 3 reaches the position just above the turntable 9, the load arm 12a is in a position spaced from the cartridge 3. Thereafter, with descent of the holder 7, the load arm 12a also goes down gradually, and when the disc 11 is placed on the turntable 9, the magnetic head 19 of the load arm 12a abuts the upper surface of the disc 11. In this state, the lower surface of the disc 11 abuts the magnetic head 19 on the carriage 12, thus permitting recording and playback on both faces.

As the cartridge 3 is inserted, a fore end portion of the shutter opening/closing member 34 provided in the cartridge holding portion 7a of the holder 7 comes into engagement with a shutter opening/closing slot 3e formed in the fore end portion 3c of the cartridge 3 as shown in FIG. 7, whereby the shutter 3b of the cartridge 3 is slidden laterally and it is completely opened when the cartridge 3 is positioned just above the turntable 9. Thus the shutter opening/closing member 34 pushes a side face of the shutter 3b laterally to open the latter, and the shutter 3b is urged in its closing direction at all times by means of a spring (not shown) within the cartridge 3, so in the eject operation the shutter 3b is closed with backward movement of the cartridge 3.

(Auto Eject Operation)

Auto eject operation will be described below.

Since auto eject operation is almost reverse to the auto loading operation, it will now be explained briefly. When information recording or reproducing operation for the disc 11 is over and an eject signal is provided from a control circuit (not shown), the loading motor 8a starts rotating in a direction reverse to the loading direction, whereupon the rack 8c begins to move toward the cartridge insertion side A through the gears 8b. With this movement, a fore end portion of the rack 8c abuts the unlocking pawl 15d, thereby causing the lock lever 15e to be pushed downward of the frame 1. As the lock lever 15e is forced down, the lock pawl 15c at the fore end of the lock lever 15e also goes down and is disengaged from the slot 5d of the load member 4, resulting in that the load member 4 becomes movable in the eject direction and it moves in that direction under the action of the loading motor 8a and gears 8b. When the load member 4 reaches a predetermined position (the original position in the cartridge insertion), the lock pawl 15c which has been in abutment with the lower surface of the load member 4 projects to the upper surface from the slot 1c of the frame 1 to lock the fore end portion of the rack 8c and at the same time the lock lever 15e rises, so that the switch 15b opens to stop the rotation of the loading motor 8a and now the eject operation is over. At this time, the cartridge 3 is projecting a predetermined amount from the holder 7 in a closed state of the shutter 3b and it is taken out by manual grasping of this projecting end.

(Manual Eject Operation)

Even in the disc driving device having such auto loading and auto eject mechanisms as constructed above, a power failure or some trouble during use would make it impossible to take out the cartridge 3 from the disc driving device. To prevent this, it is necessary to provide an additional mechanism for ejecting the cartridge 3 without intervention of an electric system. The manual eject mechanism 15 provided in this device is for the above emergency. By merely pressing the operating end 15g of the operating member 15a, the cartridge 3 can be ejected. The following description is provided about a manual eject operation in this embodiment.

FIG. 11 is a partially omitted perspective view showing in what state each component of the manual eject mechanism 15 is while the mechanism is not in operation. In this condition, the support plate 8d and the lock lever 15e are pulled toward each other by means of the spring 8g, so the final-stage gear of the gears 8b is in engagement with the rack 8c, the lock lever 15e is in abutment with the lower surface of the frame 1, and the lock pawl 15c and the unlocking pawl 15d are projecting to the upper surface of the frame 1. An actuating end 15j of the operating member 15a is in engagement with the engaging slot 8e of the projecting piece 8f formed below the support plate 8d which supports the gears 8b. The engaging slot 8e, formed in the shape of a cam slot, has a parallel portion 8k and an inclined portion 8m. It is normally kept in abutment with the cartridge insertion side of the parallel portion 8k by the action of the spring 15i.

In manual eject, by pushing the operating end 15g of the operating member 15a in the direction of arrow B, the actuating end 15j is brought into abutment with the inclined portion 8m of the engaging slot 8e of the support plate 8d. As the operating end 15g is further pushed from this position, the support plate 8d turns in the direction of arrow C about the support shaft 33 along the inclined portion 8m, so that the gears 8b are raised and the final-stage gear of the gears 8b goes away from the rack 8c. The rack 8c is now free. Thereafter, the abutting portion 15h abuts the lock pawl 15c of the lock lever 15e, causing the lock lever 15e to turn in the direction of arrow D about the support shaft 33. Upon further pushing of the operating member 15a, the lock pawl 15c comes into abutment with the lower surface of the abutting portion 15h, resulting in that the lock pawl 15c is unlocked and the load member 4 is returned to the cartridge insertion side A by virtue of a spring (not shown), while the holder 7 rises, the load arm 12a is opened and the cartridge 3 reverts to its original state in insertion. Thereafter, upon release of the operating end 15g, the operating member 15a also reverts to its state before operation by virtue of the spring 15i. At the same time, all the mechanisms revert to the respective original states before insertion of the cartridge 3, now ready for the next operation.

In this return mechanism, it suffices to push up the support plate 8d and push down the lock lever 15e at slight strokes by utilization of the slant face of cam, and the manual eject operation can be effected using an extremely small force because all the returning operations utilize the biasing force of spring.

(Housing and Carriage Shift Mechanism)

Figure 1C:
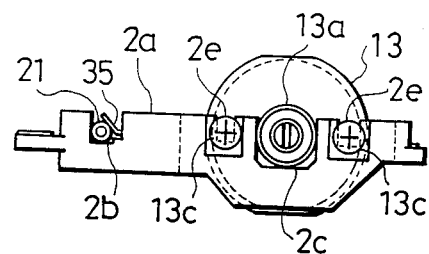
FIG. 1(c) is a left side view thereof.
Figure 1E:
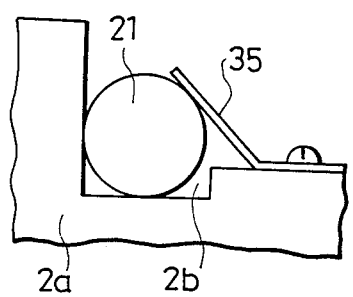
FIG. 1(e) is an end view of a principal portion showing how to mount the guide rod.
Figure 1D:
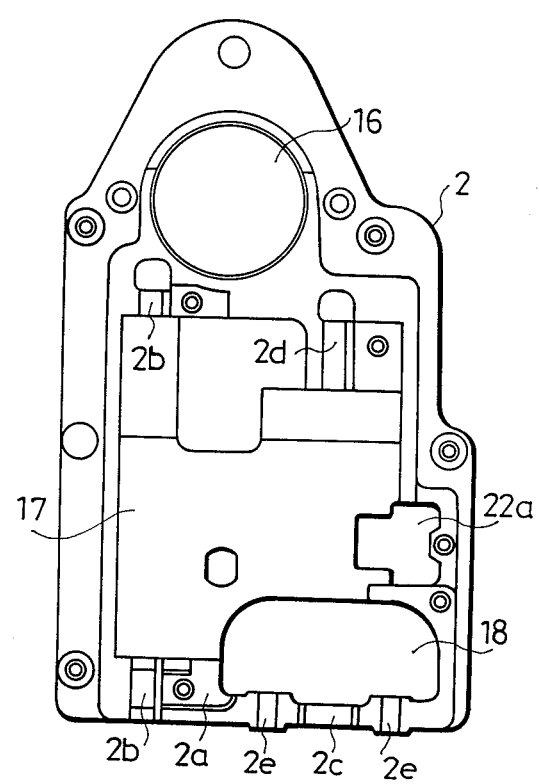
FIG. 1(d) is a plan view of the housing.

A more detailed explanation will now be made about the construction of the housing 2 and shift mechanism 14 in this embodiment. Referring to FIG. 1(d), in the housing 2 there are formed, in the shape of a through hole or a slot, a turntable mounting hole 16 in which is fitted loosely and rotatably the turntable 9 carrying the disc 11 thereon; a carriage receiving portion 17 in which the carriage 12 can perform a linear receprocative motion; a stepping motor mounting portion 18 for mounting the stepping motor 13 which moves the carriage 12; and a mounting portion 22a for mounting the O-track sensor 22 which detects a O-track position of the magnetic head 19 attached to the fore end portion of the carriage 12. Further, the guide rod 21 is mounted to an outer peripheral wall 2a of the carriage receiving portion 17 and of the stepping motor mounting portion 18 in the housing 2. Moreover, there are formed a mounting slot 2b, mounting slots 2c and 2d for mounting both bearings 13a and 13b of the stepping motor 13, and slots 2e for insertion therein of stepping motor fixing bolts 13c. These mounting slots 2b, 2c, 2d and slots 2e are formed by applying a secondary machining to a block formed by die casting of an aluminum alloy. They are each formed accurately by cutting a predetermined depth from a reference plane. Accurate machining can be done by setting a housing block on a workbench and cutting the above slots from above the housing block. Besides, by pushing a side peripheral face against lower and side faces of the guide slot 2b by means of a thin resilient plate 35, the position of the guide rod 21 is defined and thus it is not necessary at all to adjust the height unlike fixing the rod by forming a lateral hole. In this embodiment, both end portions of the guide rod 21 and the bearing portion 13b on the side where the threaded groove 20a of the screw shaft 20 is formed, are mounted by the method illustrated in FIG. 1(e). The bearing portion 13a on the stepping motor 13 side of the screw shaft 20 is fitted in the mounting slot 2c as shown in FIG. 1(c) and fixed by tightening the bolts 13c threadedly from the slots 2e to the casing of the stepping motor 13. At this time, the positioning of the stepping motor 13 is determined by the position of the bearing portion 13b relative to the mounting slot 2d and the position of abutment of the bearing portion 13a with the lower surface of the mounting slot 2c, and the height of the screw shaft 20 is completely defined by a vertical accuracy of the lower surfaces of the mounting slots 2d and 2c, it being not necessary to make a special adjustment of the height.

The height and shift accuracy of the carriage 12 is determined by a relative height of the guide rod 21 and the screw shaft 20; this means that it is determined by the height accuracy of the lower surfaces of the mounting slots 2b, 2c and 2d. Therefore, the adoption of this construction eliminates the conventional necessity of a vertical adjustment. Further, since the mounting slots 2b, 2c and 2d are formed from the upper surface of the housing 2, the guide rod 21 and the stepping motor 13 can be set from the same upper surface, thus permitting a more simplified assembling operation. According to this embodiment, therefore, there can be attained both improvement of accuracy and reduction of cost.

Figure 14A:
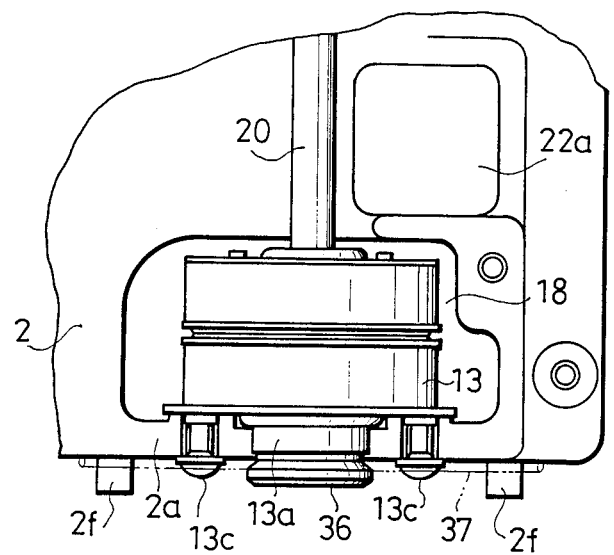
FIG. 14(a) is a plan view of a principal portion.
Figure 14B:
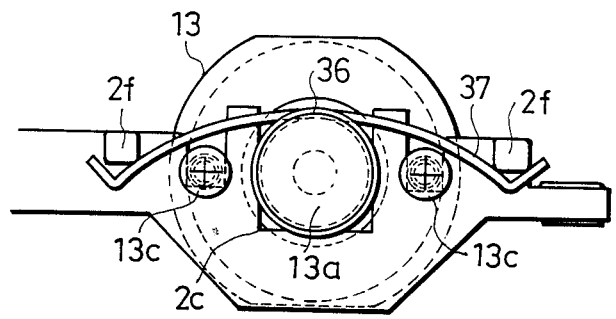
FIG. 14(b) is a front view thereof.
Figure 15:
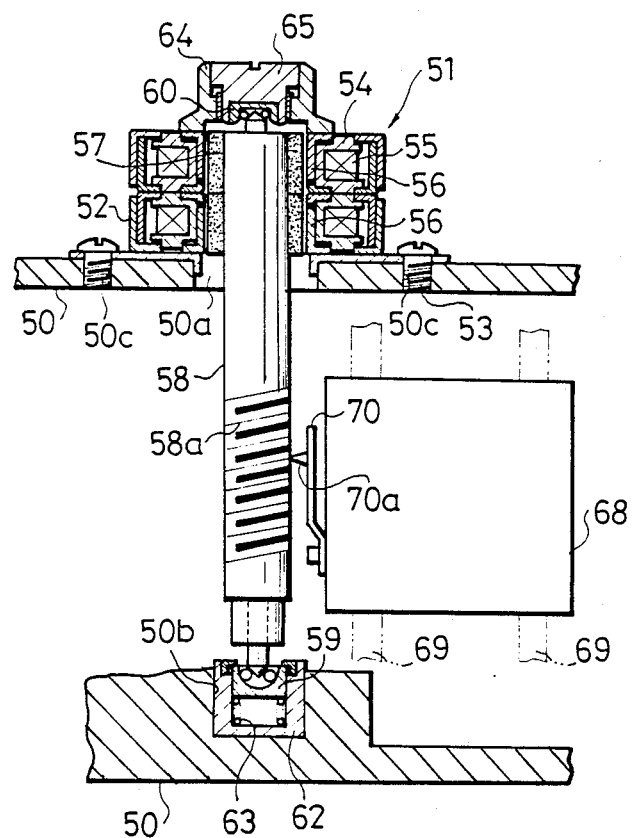
FIG. 15 is a sectional view illustrating a principal portion of a conventional construction.

A second embodiment of the present invention will be described below with reference to FIG. 14. FIG. 14(a) is a plan view of a principal portion showing a mounted state of the stepping motor 13 and FIG. 14(b) is a front view thereof.

In FIG. 14, a groove 36 having a side face spacing which becomes narrower toward the shaft center is formed in an outer peripheral part of the bearing portion 13a on the stepping motor 13 side of the screw shaft 20, and a linear spring member 37 is fitted in the groove 36 and engaged with projections 2f projecting from the outer peripheral wall 2a of the housing 2 so that it presses the bearing portion 13a against the lower surface of the mounting slot 2c with a sufficient force. Usually, with the spring member 37 alone, the bearing portion 13a and the stepping motor 13 can be held and fixed firmly. But the bolts 13c may be used for fixing them by way for precaution.

Thus, by fixing the bearing portion 13a with the linear spring member 37 by utilization of the groove 36 which is generally V-shaped, the spring member 37 is fitted in the groove 36 to sufficiently under the resilience of the spring. Besides, under the action of a frictional force induced at the contact surface, the stepping motor 13 is fixed in an extremely stable state without being easily dislocated. Other constructional points not specially referred to are all the same as in the first embodiment.

Thus, according to the second embodiment, the stepping motor 13 can be mounted accurately and extremely easily by the use of only the linear spring member 37.

As will be apparent from the above description, according to the present invention in which mounting slots for a carriage-sliding guide rod and for bearing portions of a stepping motor screw shaft are formed in an upper surface of the housing and the guide rod and the screw shaft are fitted in those mounting slots, it is possible to provide inexpensively a disc driving device having an accurate carriage shift mechanism.

What is claimed is:

1. A carriage shift mechanism for a disk driving device having a chassis into which a disk cartridge containing a magnetic disk is inserted in a rearward longitudinal direction horizontally through a slot in a front side thereof into the chassis along an insertion path to a loading position on a turntable for rotating the disk, and a carriage supporting a magnetic head for movement in a radial direction of the magnetic disk to record and reproduce information therefrom, the carriage shift mechanism comprising:

- a housing assembly plate (2) mounted in a horizontal plane toward a rear side of the chassis and having an upper surface on which fore and rear guide slots (2b) are formed spaced apart and aligned in the longitudinal direction, and on which fore and rear bearing slots (2d, 2c) are formed spaced apart and aligned in the longitudinal direction, the longitudinally aligned guide slots being arranged in parallel and spaced apart laterally from the longitudinally aligned bearing slots, said plate further having a motor mounting opening (18) formed adjacent the rear bearing slot and a pair of motor mounting slots (2e) spaced on each side of the rear bearing slot (2c);
- a stepping motor (13) mounted in the motor mounting opening (18) of the housing assembly plate (2) provided with a screw shaft (20) extending axially in the longitudinal direction from a front side thereof terminating in a fore bearing end (13b) and provided on a rear side thereof with a rear bearing end (13a), the fore bearing end (13b) being assembled in the fore bearing slot (2d), the rear bearing end (13a) being assembled in the rear slot (2c), and a pair of motor fixing bolts (13c) being assembled in the motor mounting slots (2e) and fixed to the rear side of the stepping motor (13);
- a guide rod (21) disposed longitudinally with its ends assembled in the fore and rear guide slots (2b); and
- a carriage (12) supporting a magnetic head mounted slidably longitudinally on the guide rod (21) and having an engaging piece (23) extending laterally therefrom which is meshingly engaged with the screw shaft (20) of the stepping motor so as to drive the carriage in longitudinal movement in response to rotation of the screw shaft by the stepping motor,
- wherein the guide slots (2b), bearing slots (2d, 2c) and motor mounting slots (2e) can be machined in the housing assembly plate (2) to precise depths relative to the horizontal plane thereof so that the guide rod, carriage, motor, and screw shaft can be assembled thereon to provide precise vertical height positioning of the carriage and magnetic head relative to the disk insertion path and the magnetic disk and eliminate the need for any vertical height adjustments thereof, and
- wherein the rear bearing end (13a) of the stepping motor is provided with a peripheral groove (36) which has a V-shaped cross-section, the groove being located outwardly of the rear bearing slot (2c), and the housing assembly plate (2) having means (2f) in conjunction with the rear bearing slot (2c) for mounting a linear spring (37) pressed in the groove so that the stepping motor can be mounted accurately on the housing assembly plate.

* * * * *